US008373747B2

(12) United States Patent
Hsiung et al.

(10) Patent No.: US 8,373,747 B2
(45) Date of Patent: Feb. 12, 2013

(54) IMAGING DEVICE FOR GENERATING AND DISPLAYING IMAGES TO SIMULATE MOVEMENT OF THREE-DIMENSIONAL OBJECTS

(75) Inventors: Chao-Wang Hsiung, Taoyuan County (TW); Hsien-Wen Chang, Taipei (TW)

(73) Assignee: Innovisions Labs Co., Ltd., Taipei County (TW)

( * ) Notice: Subject to any disclaimer, the term of this patent is extended or adjusted under 35 U.S.C. 154(b) by 525 days.

(21) Appl. No.: 12/630,110

(22) Filed: Dec. 3, 2009

(65) Prior Publication Data

US 2011/0037834 A1 Feb. 17, 2011

(30) Foreign Application Priority Data

Aug. 14, 2009 (TW) ................................ 98215084 U

(51) Int. Cl.
*H04N 13/04* (2006.01)
(52) U.S. Cl. ......................................................... 348/54
(58) Field of Classification Search .......................... None
See application file for complete search history.

(56) References Cited

U.S. PATENT DOCUMENTS 7,168,809 B2 * 1/2007 Hoshino et al. .................... 353/7
2008/0266523 A1 * 10/2008 Otsuka et al. ...................... 353/7

* cited by examiner

*Primary Examiner* — Richard Torrente
(74) *Attorney, Agent, or Firm* — WPAT, P.C.; Anthony King

(57) ABSTRACT

An imaging device for generating and displaying image to simulate movement of 3D objects includes a frame, imaging units, and image output units. The imaging units are arranged between two opposite sides of the frame and connected to one another to define an imaging space therebetween. One side of each imaging unit connects to the frame at a first angle and the opposite side thereof connected to the frame at a second angle. The image output units are arranged on the side of the frame where forming the second angle, such that the image output units face the imaging units in one-to-one correspondence to separately present a first image. The first images presented by the image output units are identical to one another, and are separately transferred by corresponding imaging units to the imaging space to form a simulated image in the imaging space.

19 Claims, 4 Drawing Sheets

IMAGING DEVICE FOR GENERATING AND DISPLAYING IMAGES TO SIMULATE MOVEMENT OF THREE-DIMENSIONAL OBJECTS

FIELD OF THE INVENTION

The present invention relates to an imaging device, and more particularly to an imaging device for generating and displaying images to simulate movement of three-dimensional objects.

BACKGROUND OF THE INVENTION

Currently, most of the image output devices known among the general public, such as the cathode ray tube (CRT) television, the liquid crystal display (LCD) television, the plasma television, the three-beam projector, the single-beam projector, etc., are designed to display images on a single plane. When viewing from a position beyond a limited view angle provided by the display plane of the image device, it would be unable to see the image presented by the image output device.

Further, the so-called magic theatre is a large-scale indoor amusement product and is also referred to as an illusion performance theatre. In the magic theatre, virtual imaging technology, computer synthesizing technology and optical reflection principle are employed for combining real objects and images reflected from real objects to complete the performance on a stage. In the magic theatre, extremely special, unique and unimaginable performance effect can be performed by the theater systems with real performers and real stages. The magic theatre is capable of showing various surreal materials. For example, with the technologies adopted by the magic theatre, the performers can appear on or vanish from the stage in a blink without leaving any visible trace, fire and smoke can be changed into various incredible images or objects, such as cute birds or dancing people, and a real person can be suddenly changed into a bird, etc.

However, in the magic theatre, the real stage scenes and the images from image reflecting devices can only be presented on planes of different depths. The audience is not able to see the same real scenes, objects and the virtual images from different view angles of the stage. Therefore, the magic theatre has undesired limitation on its operation.

In brief, either the conventional image output devices or the magic theatre that combines the advanced virtual imaging technology, computer synthesizing technology and the optical reflection principle can only output the images to the same plane or planes of different depths. Thus, the audience could not freely view the images from different angles of the stage. It is therefore desirable to develop an improved imaging device to solve the above problem.

SUMMARY OF THE INVENTION

A primary object of the present invention is to provide an imaging device for generating and displaying images to simulate movement of three-dimensional objects, and to solve the problem of the conventional image output devices or the magic theatre that images can only be output to the same plane or planes of different depths.

According to the present invention, an object of the imaging device for generating and displaying images to simulate movement of three-dimensional objects includes a frame, a plurality of imaging units, and a plurality of image output units. The imaging units are arranged between two opposite sides of the frame and connected to one another to define an imaging space therebetween. One side of each imaging unit connects to the frame at a first angle inside the imaging space and the opposite side thereof connected to the frame at a second angle outside the imaging space. The image output units are arranged on the side of the frame where the imaging unit connected to at the second angle. Thus, the image output units face the imaging units in one-to-one correspondence to separately output a first image. The first images output by the image output units are simultaneously transferred by the corresponding imaging units to the imaging space to form a simulated image of 3D object in the imaging space.

According to the above arrangements, the imaging device of the present invention provides the following advantages:

(1) The audience can see the simulated images of 3D objects formed in the imaging space and see them from every view angle of the imaging device; and (2) A full simulated image can also be seen at joints of the imaging units without deformation. Therefore, the present invention solves the problem of the conventional image output devices or the magic theatre that images can only be output to the same plane or to planes of different depths.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
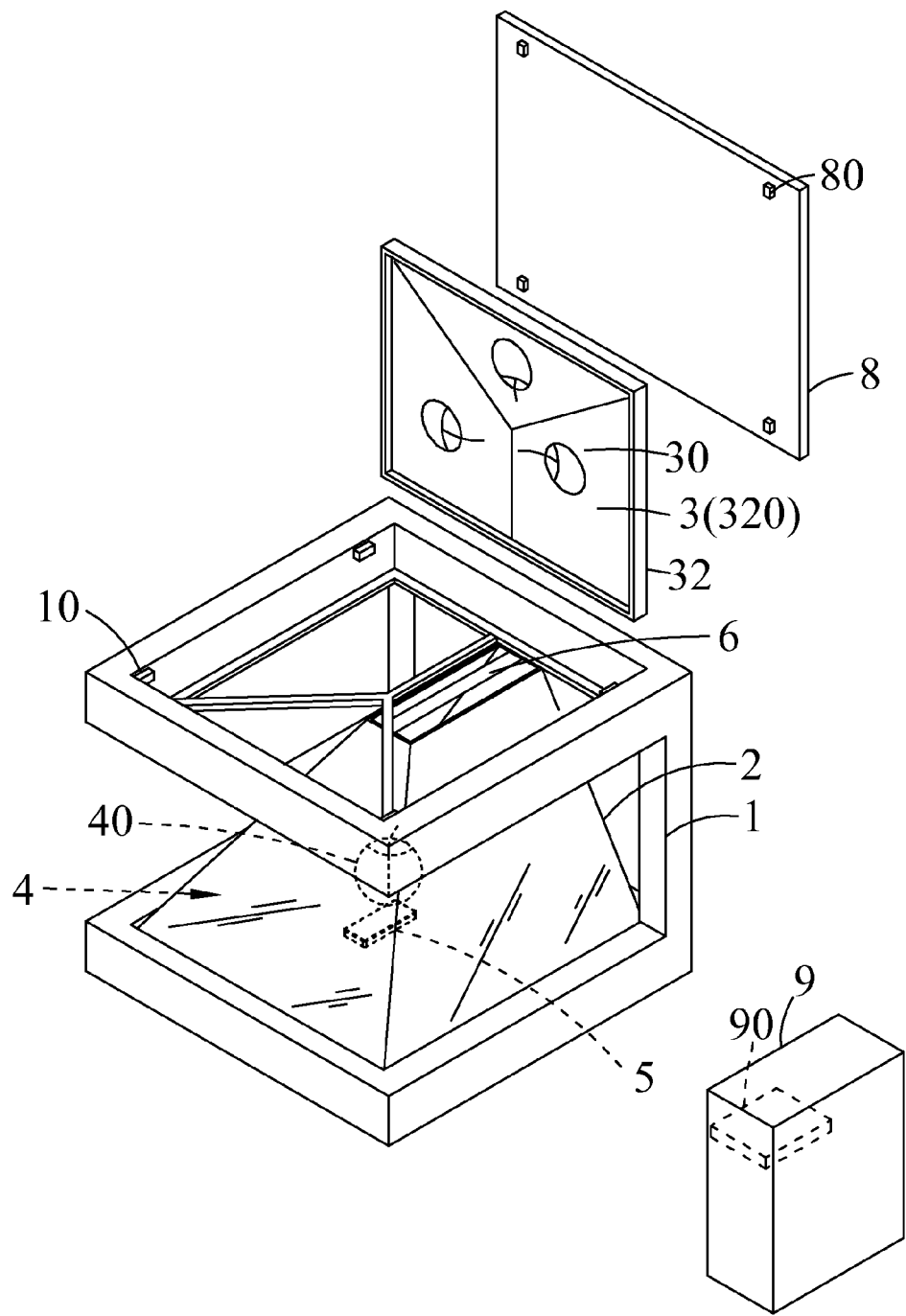
FIG. 1 is a schematic exploded perspective view of an imaging device for generating and displaying images according to the first embodiment of the present invention.

The present invention will now be described with some preferred embodiments thereof. For the purpose of easy to understand, the same elements in the preferred embodiments are denoted by the same reference numerals.

Please refer to FIG. 1 that is a schematic exploded perspective view of an imaging device for generating and displaying images according to the first embodiment of the present invention. As shown, the imaging device includes a frame 1, a plurality of imaging units 2, and a plurality of image output units 3. The imaging units 2 are arranged between two opposite sides of the frame 1 and connected to one another to define an imaging space 4 therebetween. One side of each imaging unit 2 connects to the frame 1 at an angle θ inside the imaging space 4 and the opposite side thereof connected to the frame 1 at an angle α outside the imaging space. The image output units 3 are arranged on the side of the frame 1 where the imaging units 2 connected to at the angle α, such that the image output units 3 face the imaging units 2 in one-to-one correspondence to separately present a first image 30, and the first images 30 presented by the image output units 3 are identical to one another. The first images 30 are separately transferred by corresponding imaging units 2 to the imaging space 4 to form a simulated image 40 of a 3D object in the imaging space 4. Thus, the audience can see the simulated image 40 of the 3D object from different view angle of the imaging device. The audience can also see full simulated image 40 at joints of the imaging units 2 without deformation. With these arrangements, the present invention solves the problem of the conventional image output devices or the magic theatre that images can only be output to the same plane or to planes of different depths.

According to the first embodiment of the present invention illustrated in FIG. 1, the image output units 3 are located on the upside of the frame 1, and are formed by splitting a display panel 32, such as a liquid crystal display (LCD) panel, a plasma display panel, a projector lens, or a television screen, into several display sections 320, each of the display sections 320 forms one image output unit 3 and has the same size as that of the imaging units 2, so that the first images 30 are transferred by the imaging units 2 to the corresponding position in the imaging space 4. In this manner, the simulated image 40 formed in the imaging space 4 is always the same when viewing from different imaging units 2.

Figure 2:
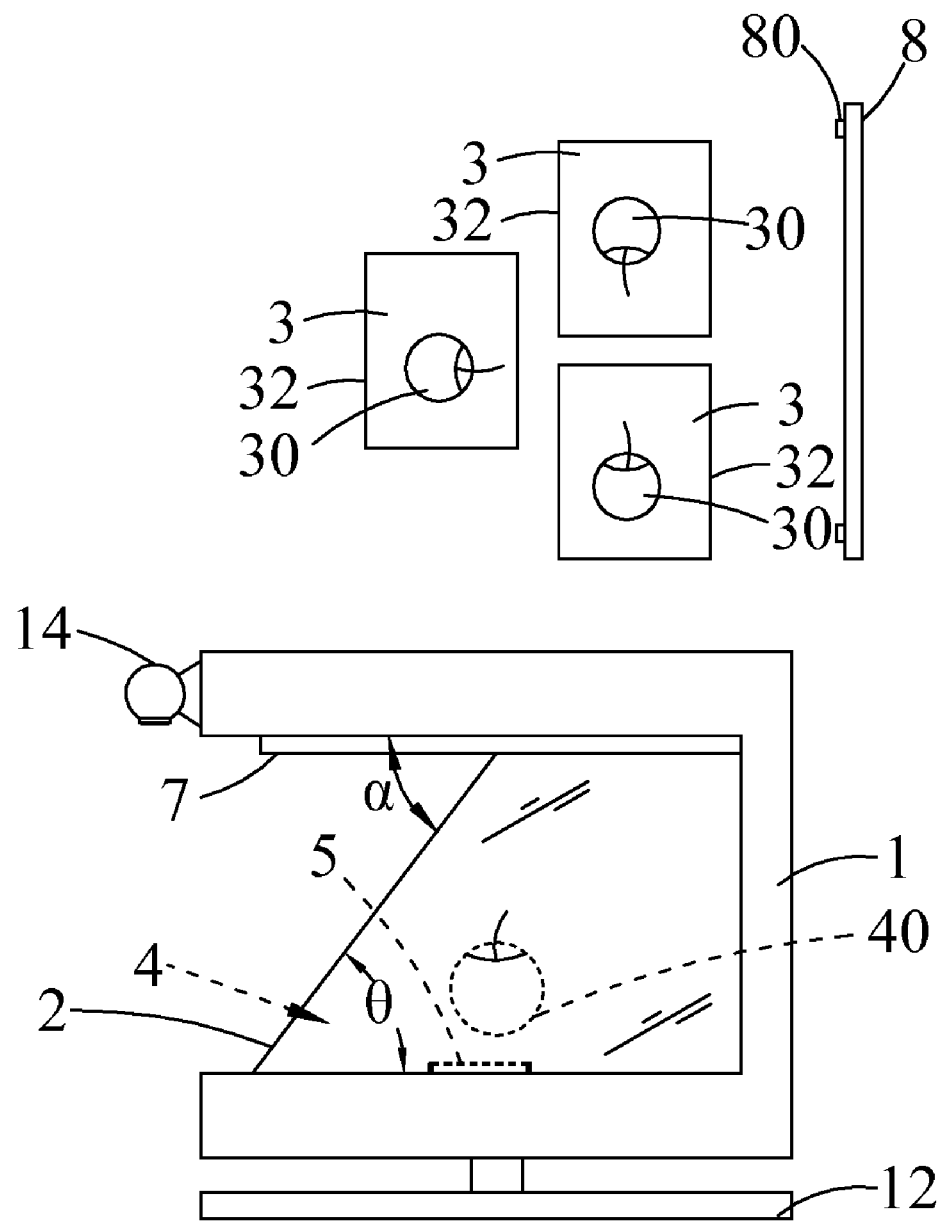
FIG. 2 is a schematic exploded side view of an imaging device for generating and displaying images according to the second embodiment of the present invention.

FIG. 2 shows the second embodiment of the present invention. In the second embodiment, each one of the image output units 3 is a display panel 32. These display panels 32 are located on the upside of the frame 1 and have a size corresponding to the imaging units 2 for respectively outputting a first image 30. The first images 30 are transferred by the imaging units 2 to the corresponding position in the imaging space 4. Therefore, the simulated image 40 formed in the imaging space 4 is always the same when viewing from different imaging units 2.

Please refer to FIGS. 1 and 2. In the first and the second embodiment of the present invention, at least one real object 5 may be positioned on the bottom of the frame 1 within the imaging space 4, and the simulated image 40 formed in the imaging space 4 is located above the real object 5. With this arrangement, the audience will see a simulated image 40 of the real object 5 as if the simulated image 40 were floating and projected from the real object 5.

Please refer to FIG. 1, in the aforementioned embodiments, a light-emitting unit 6 may be provided in the imaging space 4 adjacent to the upside of the frame 1. The light-emitting unit 6 is adapted to project a light source toward the bottom of the frame 1, so that the real object 5 in the imaging space 4 can be more clearly seen. However, the light-emitting unit 6 must not have brightness higher than that of the simulated image 40 to avoid the problem of an unclear simulated image 40. The light-emitting unit 6 may comprise, for example, at least one light-emitting diode (LED), at least one fluorescent lamp, at least one cold cathode fluorescent lamp (CCFL), at least one neon lamp or the like.

Please refer to FIG. 2, in the aforementioned embodiments, a shielding unit 7 is provided on the upside of the frame 1 and at a position adjacent to the image output units 3. The shielding unit 7 shields the image output units 3 and the light-emitting unit 6 from exposure to audience, lest the audience finds out that the simulated image 40 is formed by projecting the first images 30 into the imaging space 4. Further, a cover 8 is provided above the frame 1 to cover the image output units 3. The cover 8 also prevents the audience from finding that the simulated image 40 is formed by projecting the first images 30 into the imaging space 4.

In the aforementioned embodiments, the imaging device further includes a control unit 9, which can be provided within or outside the frame 1 and is connected to the image output units 3 for providing at least one first image 30 to the image output units 3. The control unit 9 can be a personal computer, a notebook computer, a digital album or the like.

Moreover, in FIG. 1, the frame 1 is provided with at least one first fastening element 10 at the top along peripheral edges thereof, and the cover 8 is provided with a second fastening element 80 at a position corresponding to the at least one first fastening element 10. When the cover 8 is closed onto the top of the frame 1, the first fastening element 10 and the second fastening element 80 are fastened to each other to prevent the cover 8 from falling off. In the illustrated first and second embodiments, the first fastening element 10 may be a magnet, and the second fastening element 80 may be a magnet or a metal plate that can be magnetically attracted to a magnet.

Figure 3:
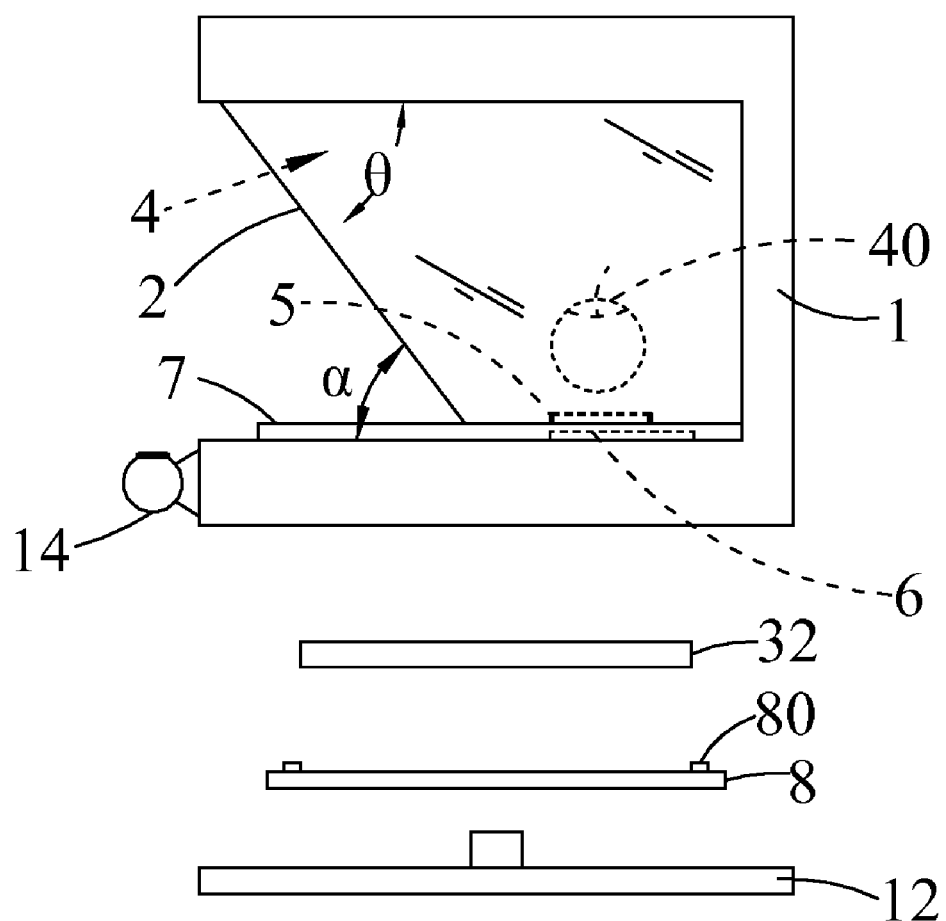
FIG. 3 is a schematic exploded side view of an imaging device for generating and displaying images according to the third embodiment of the present invention.

Please refer to FIG. 3 that shows the third embodiment of the present invention. In the third embodiment, the image output units 3 are arranged on the bottom of the frame 1 and formed by splitting a display panel 32 into several display sections 320, each of the display sections 320 forms one image output unit 3. The display sections 320 have the same size as that of the corresponding imaging units 2, so that the first images 30 are transferred by the imaging units 2 to the corresponding position in the imaging space 4. In this manner, the simulated image 40 formed in the imaging space 4 is always the same no matter viewing from which imaging units 2.

Figure 4:
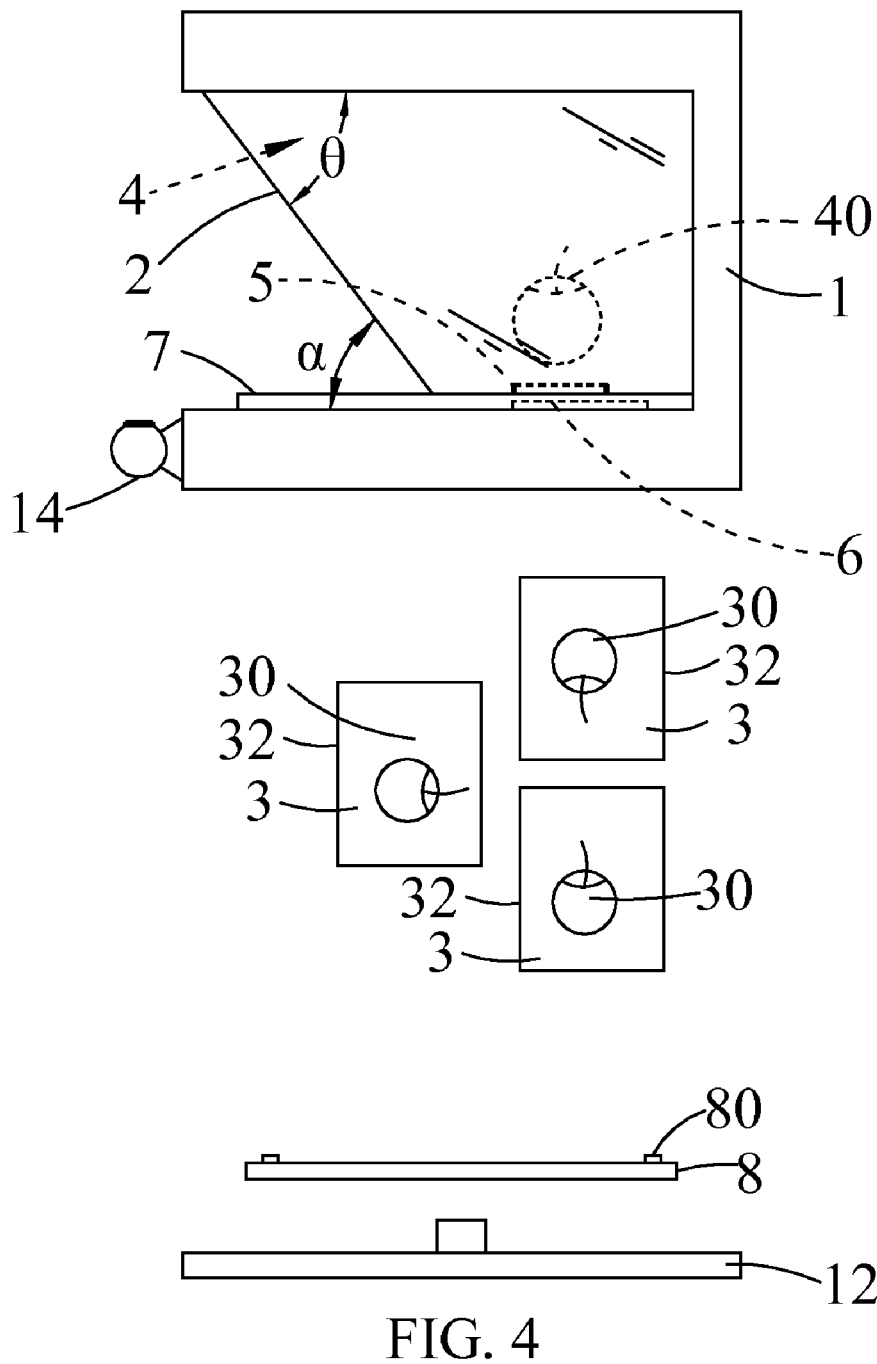
FIG. 4 is a schematic exploded side view of an imaging device for generating and displaying images according to the fourth embodiment of the present invention.

Please refer to FIG. 4 that shows the fourth embodiment of the present invention. In the fourth embodiment, each one of the image output units 3 is a display panel 32. These display panels 32 are located on the bottom of the frame 1 and have a size corresponding to the imaging units 2 for respectively outputting a first image 30. The output first images 30 are transferred by the imaging units 2 to the corresponding position in the imaging space 4. Therefore, the simulated image 40 formed in the imaging space 4 is always the same no matter viewing from which imaging units 2.

In the third and fourth embodiments, the frame 1 is provided with at least one first fastening element 10 at the bottom and along peripheral edges thereof, and the cover 8 is provided with a second fastening element 80 at a position corresponding to the at least one first fastening element 10. When the cover 8 is closed onto the bottom of the frame 1, the first fastening element 10 and the second fastening element 80 are fastened to each other to prevent the cover 8 from falling off. In the illustrated third and fourth embodiments, the first fastening element 10 is a magnet, and the second fastening element 80 may be a magnet or a metal plate that can be magnetically attracted to a magnet.

In the aforementioned third and fourth embodiments, the imaging device further includes a control unit 9, which may be provided within or outside the frame 1 and be connected to the image output units 3 for providing at least one first image 30 to the image output units 3. The control unit 9 may be a personal computer, a notebook computer, a digital album or the like.

Further, in aforementioned third and fourth embodiments, a light-emitting unit 6 is provided in the imaging space 4 adjacent to the upside of the frame 1. The light-emitting unit 6 is adapted to project a light source toward the bottom of the frame 1, so that the real object 5 in the imaging space 4 can be more clearly seen. However, the light-emitting unit 6 can not have brightness higher than that of the simulated image 40 to avoid the problem of an unclear simulated image 40. The light-emitting unit 6 may consist of, for example, at least one light-emitting diode (LED), at least one fluorescent lamp, at least one cold cathode fluorescent lamp (CCFL), at least one neon lamp or the like.

Further, in the illustrated third and fourth embodiments, a shielding unit 7 is provided to the bottom of the frame 1 and adjacent to the image output units 3. The shielding unit 7 shields the image output units 3 and the light-emitting unit 6 from exposure to the audience, lest the audience find out that the simulated image 40 is formed by projecting the first images 30 to the imaging space 4. Further, the cover 8 provided on the bottom of the frame 1 covers the image output units 3 and prevents the audience from finding out that the simulated image 40 is formed by projecting the first images 30 into the imaging space 4.

In the aforementioned first to fourth embodiments, there is a rotating unit 12 provided below the bottom of the frame 1 for making the frame 1 rotate; each of the imaging units 2 may be a semi-reflection mirror, a semi-reflection glass plate, or a film coated with a semi-reflection material. Also, the range of the first angle θ and second angle α are both from 0° and to 90°. The first images 30 may be adjusted in shape and size according to the first angle θ. For example, if the first angle θ and second angle α are both 45°, the first image 30 may remain the original ratio. However, if the first angle θ is 60° and second angle α is 30°, the first image 30 may subject to deformation in order to transform it into a normal size simulated image 40.

Please refer to FIG. 1, in the aforementioned illustrated embodiments, the frame 1 is provided with an image capture unit 14 on any edge of the bottom or the top thereof, and the control unit 9 is internally provided with an interactive module 90. The image capture unit 14 is adapted to catch at least one external image, and the interactive module 90 is adapted to change the first images 30 in response to any change in the characteristics of the captured external image. For example, the first images 30 can be deformed, displaced, or changed according to the changes or movement of the external image, so that the simulated image will further show corresponding changes. Moreover, the interactive module 90 may be adopted to switch the first images 30, for instance, when the captured external image is about a user's hand movement of swinging leftward, the interactive module 90 of the control unit 9 will compute it and then output a previous first image 30. On the other hand, when the captured external image is about a user's hand movement of swinging rightward, the interactive module 90 of the control unit 9 will receive it and output a next first image 30. Alternatively, when the captured external image is a user's hand movement of swinging leftward and rightward, the interactive module 90 of the control unit 9 will randomly output different first images 30.

With the above arrangements, the imaging device of the present invention can solve the problem of the conventional image output devices or the magic theatre that images can only be output to the same plane or to planes of different depths, and allow the audience to see the simulated image 40 in the imaging space 4 from various viewing angles.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An imaging device for generating and displaying images to simulate movement of 3D objects comprising:
    a frame;
    a plurality of imaging units arranged between two opposite sides of the frame and being connected to one another to define an imaging space, one side of each imaging unit being connected to the frame at a first angle inside the imaging space and the opposite side thereof being connected to the frame at a second angle outside the imaging space;
    a plurality of image output units arranged on the side of the frame where the second angle is formed and each one of the image output units corresponding to one of the imaging units; wherein the plurality of image output units presenting a first image transferred simultaneously by the corresponding plurality of imaging units into the imaging space to form a simulated image of a 3D object in the imaging space; and
    a light-emitting unit provided in the imaging space adjacent to the side of the frame, where the second angle is formed, to project light from the light-emitting unit to the opposite side of the frame;
    wherein the brightness of the light-emitting unit is lower than that of the simulated image.

2. The imaging device as claimed in claim 1, wherein the plurality of image output units are arranged on the side of the frame where the second angle is formed and the plurality of image output units are formed by dividing a display panel into a plurality of display sections, in which each of the plurality of display sections is corresponding to one of the plurality of image output units and comprises the same size thereof.

3. The imaging device as claimed in claim 1, wherein each one of the plurality of image output units is a display panel located on the side of the frame, where the second angle is formed, and has a same size as the corresponding imaging unit thereof, and each one of the plurality of image output units respectively outputs one of the first images.

4. The imaging device as claimed in claim 1, wherein at least one real object is disposed inside the imaging space, and further the simulated image of the 3D object is formed in the imaging space and are located around the real object.

5. The imaging device as claimed in claim 1, wherein the light-emitting unit is selected from the group consisting of at least one LED, at least one fluorescent lamp, at least one CCFL, and at least one neon lamp.

6. The imaging device as claimed in claim 1 further comprising a shielding unit provided on a location neighboring the side of the frame, where the second angle is formed, for shielding the plurality of image output units and the light-emitting unit from being seen.

7. The imaging device as claimed in claim 1 further comprising a cover provided on the side of the frame, where the second angle is formed, for covering the image output units.

8. The imaging device as claimed in claim 7, wherein the frame is provided with at least one first fastening element along peripheral edges thereof on the side where the second angle is formed, and the cover is provided with at least one second fastening element at a position corresponding to the at least one first fastening element; when the cover is closed onto the frame, each of the first fastening element and the corresponding second fastening element thereof are fastened to each other.

9. The imaging device as claimed in claim 8, wherein the first fastening element is a magnet and the second fastening element is selected from the group consisting of a magnet and a metal plate magnetically attractable to a magnet.

10. The imaging device as claimed in claim 1 further comprising a control unit arranged within or outside the frame, and connected to the plurality of image output units for providing at least one first image to the plurality of image output units.

11. The imaging device as claimed in claim 10, wherein the control unit is selected from a personal computer, a notebook computer, and a digital album.

12. The imaging device as claimed in claim 10 further comprising:
   an image capture unit provided on any peripheral edge of the frame for catching an external image; and
   an interactive module disposed on the control unit and adapted to change the first images in response to any characteristics change of the captured external image, so that the simulated image of the 3D object further showing changes correspondingly.

13. The imaging device as claimed in claim 12, wherein the interactive module is further adapted to switch the first image after detecting preset images by the image capture unit.

14. The imaging device as claimed in claim 12, wherein each of the imaging units is selected from the group consisting of a semi-reflection minor, a semi-reflection glass plate, and a film coated with a semi-reflection material.

15. The imaging device as claimed in claim 1 further comprising a rotating unit provided under the frame for making the frame rotate.

16. The imaging device as claimed in claim 1, wherein the first angle is larger than 0° and smaller than 90°, and the first image is adjustable in shape and size according to the first angle.

17. The imaging device as claimed in claim 1, wherein the first angle and the second angle are formed to simulate a image of the 3D object with normal ratio.

18. An imaging device for generating and displaying images to simulate movement of 3D objects comprising:
   a frame;
   a plurality of imaging units arranged between two opposite sides of the frame and being connected to one another to define an imaging space, one side of each imaging unit being connected to the frame at a first angle inside the imaging space and the opposite side thereof being connected to the frame at a second angle outside the imaging space;
   a plurality of image output units arranged on the side of the frame where the second angle is formed and each one of the image output units corresponding to one of the imaging units; wherein the plurality of image output units presenting a first image transferred simultaneously by the corresponding plurality of imaging units into the imaging space to form a simulated image of a 3D object in the imaging space;
   a light-emitting unit provided in the imaging space adjacent to the side of the frame, where the second angle is formed, to project light from the light-emitting unit to the opposite side of the frame; and
   a cover provided on the side of the frame, where the second angle is formed, for covering the image output units;
   wherein the frame is provided with at least one first fastening element along peripheral edges thereof on the side where the second angle is formed, and the cover is provided with at least one second fastening element at a position corresponding to the at least one first fastening element; when the cover is closed onto the frame, each of the first fastening element and the corresponding second fastening element thereof are fastened to each other.

19. An imaging device for generating and displaying images to simulate movement of 3D objects comprising:
   a frame;
   a plurality of imaging units arranged between two opposite sides of the frame and being connected to one another to define an imaging space, one side of each imaging unit being connected to the frame at a first angle inside the imaging space and the opposite side thereof being connected to the frame at a second angle outside the imaging space;
   a plurality of image output units arranged on the side of the frame where the second angle is formed and each one of the image output units corresponding to one of the imaging units; wherein the plurality of image output units presenting a first image transferred simultaneously by the corresponding plurality of imaging units into the imaging space to form a simulated image of a 3D object in the imaging space;
   a control unit arranged within or outside the frame, and connected to the plurality of image output units for providing at least one first image to the plurality of image output units;
   an image capture unit provided on any peripheral edge of the frame for catching an external image; and
   an interactive module disposed on the control unit and adapted to change the first images in response to any characteristics change of the captured external image, so that the simulated image of the 3D object further showing changes correspondingly.

* * * * *